United States Patent
Tretter et al.

(10) Patent No.: US 10,156,937 B2
(45) Date of Patent: Dec. 18, 2018

(54) DETERMINING A SEGMENTATION BOUNDARY BASED ON IMAGES REPRESENTING AN OBJECT

(71) Applicant: Hewlett-Packard Development Company, L.P., Houston, TX (US)

(72) Inventors: Daniel R Tretter, San Jose, CA (US); Jinman Kang, San Diego, CA (US); Kar Han Tan, Sunnyvale, CA (US); Wei Hong, Sunnyvale, CA (US); David Bradley Short, San Diego, CA (US); Otto Sievert, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 79 days.

(21) Appl. No.: 15/024,107

(22) PCT Filed: Sep. 24, 2013

(86) PCT No.: PCT/US2013/061412
§ 371 (c)(1),
(2) Date: Mar. 23, 2016

(87) PCT Pub. No.: WO2015/047225
PCT Pub. Date: Apr. 2, 2015

(65) Prior Publication Data
US 2016/0231866 A1    Aug. 11, 2016

(51) Int. Cl.
*G06F 3/042*    (2006.01)
*G06F 3/14*    (2006.01)
(Continued)

(52) U.S. Cl.
CPC ........ *G06F 3/0425* (2013.01); *G06F 3/03547* (2013.01); *G06F 3/14* (2013.01);
(Continued)

(58) Field of Classification Search
CPC ...... G06F 3/0425; G06F 3/03547; G06F 3/14; G06T 7/174; G06T 7/13;
(Continued)

(56) References Cited

U.S. PATENT DOCUMENTS 6,044,165 A    3/2000    Perona et al.
6,246,395 B1    6/2001    Goyins et al.
(Continued)

FOREIGN PATENT DOCUMENTS

CN    1191714 C    3/2005
TW    200913673 A    3/2009
(Continued)

OTHER PUBLICATIONS

Agarwal et al., "High Precision Multi-touch Sensing on Surfaces using Overhead Cameras," Tabletop'07 IEEE, 2007 ~ 4 pages.
(Continued)

*Primary Examiner* — Rodney Amadiz
(74) *Attorney, Agent, or Firm* — HP Inc. Patent Department

(57) ABSTRACT

Examples disclosed herein relate to determining a segmentation boundary based on images representing an object. Examples include an IR image based on IR light reflected by an object disposed between an IR camera and an IR-absorbing surface, a color image representing the object disposed between the color camera and the IR-absorbing surface, and determining a segmentation boundary for the object.

12 Claims, 7 Drawing Sheets

(51) Int. Cl.
  *G06F 3/0354* (2013.01)
  *G06T 7/13* (2017.01)
  *G06T 7/174* (2017.01)

(52) U.S. Cl.
  CPC .............. *G06T 7/13* (2017.01); *G06T 7/174* (2017.01); *G06T 2207/10024* (2013.01); *G06T 2207/10028* (2013.01); *G06T 2207/10048* (2013.01)

(58) Field of Classification Search
  CPC . G06T 2207/10048; G06T 2207/10028; G06T 2207/10024
  See application file for complete search history.

(56) References Cited

U.S. PATENT DOCUMENTS

| | | | |
|---|---|---|---|
| 6,633,671 | B2 | 10/2003 | Munich et al. |
| 7,023,536 | B2 | 4/2006 | Zhang et al. |
| 7,038,846 | B2 | 5/2006 | Mandella et al. |
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl et al. |
| 7,268,956 | B2 | 9/2007 | Mandella et al. |
| 7,433,024 | B2 | 10/2008 | Garcia et al. |
| 7,474,809 | B2 | 1/2009 | Carl et al. |
| 7,561,146 | B1 | 7/2009 | Hotelling |
| 7,599,561 | B2 | 10/2009 | Wilson et al. |
| 7,710,391 | B2 | 5/2010 | Bell et al. |
| 7,729,515 | B2 | 6/2010 | Mandella et al. |
| 7,826,641 | B2 | 11/2010 | Mandella et al. |
| 7,834,855 | B2 | 11/2010 | Hotelling et al. |
| 7,961,909 | B2 | 6/2011 | Mandella et al. |
| 8,121,640 | B2 | 2/2012 | Russ et al. |
| 8,134,637 | B2 | 3/2012 | Rossbach et al. |
| 8,199,117 | B2 | 6/2012 | Izadi et al. |
| 8,294,047 | B2 | 10/2012 | Westerman et al. |
| 8,348,747 | B2 | 1/2013 | Arezina et al. |
| 8,358,815 | B2 | 1/2013 | Benkley et al. |
| 8,401,225 | B2 | 3/2013 | Newcombe et al. |
| 8,736,583 | B2 | 5/2014 | Anderson et al. |
| 8,897,494 | B2 | 11/2014 | Mandella et al. |
| 2002/0065121 | A1 | 5/2002 | Fukunaga et al. |
| 2005/0078092 | A1 | 4/2005 | Clapper |
| 2005/0168437 | A1 | 8/2005 | Carl et al. |
| 2006/0139314 | A1 | 6/2006 | Bell |
| 2007/0216894 | A1 | 9/2007 | Garcia et al. |
| 2007/0268273 | A1 | 11/2007 | Westerman et al. |
| 2007/0279494 | A1 | 12/2007 | Aman et al. |
| 2008/0018591 | A1 | 1/2008 | Pittel et al. |
| 2008/0196945 | A1 | 8/2008 | Konstas |
| 2009/0129674 | A1 | 5/2009 | Lin |
| 2009/0309838 | A1 | 12/2009 | Adan et al. |
| 2010/0302376 | A1 | 12/2010 | Boulanger et al. |
| 2011/0001903 | A1 | 1/2011 | Kang |
| 2011/0227876 | A1 | 9/2011 | Ilmonen |
| 2011/0227915 | A1 | 9/2011 | Mandella et al. |
| 2011/0242054 | A1 | 10/2011 | Tsu |
| 2011/0285910 | A1* | 11/2011 | Bamji ..................... G01S 17/89 348/631 |
| 2011/0293179 | A1 | 12/2011 | Dikmen et al. |
| 2012/0038549 | A1 | 2/2012 | Mandella et al. |
| 2012/0127070 | A1 | 5/2012 | Ryoo et al. |
| 2012/0262407 | A1 | 10/2012 | Hinckley et al. |
| 2012/0320157 | A1 | 12/2012 | Junuzovic et al. |
| 2012/0320158 | A1 | 12/2012 | Junuzovic et al. |
| 2012/0327089 | A1 | 12/2012 | Lee et al. |
| 2013/0050133 | A1 | 2/2013 | Brakensiek et al. |
| 2013/0057515 | A1 | 3/2013 | Wilson |
| 2013/0077236 | A1 | 3/2013 | Becze et al. |
| 2013/0136358 | A1 | 5/2013 | Dedhia et al. |
| 2013/0194418 | A1 | 8/2013 | Gonzalez-Banos et al. |
| 2013/0222287 | A1 | 8/2013 | Bae et al. |
| 2013/0230237 | A1 | 9/2013 | Schlosser et al. |
| 2013/0234992 | A1 | 9/2013 | Hodges et al. |
| 2013/0246861 | A1 | 9/2013 | Colley et al. |
| 2013/0300659 | A1 | 11/2013 | Kang et al. |
| 2014/0029788 | A1 | 1/2014 | Kang |
| 2014/0168367 | A1 | 6/2014 | Kang |

FOREIGN PATENT DOCUMENTS

| | | |
|---|---|---|
| TW | 201120684 A | 6/2011 |
| TW | 201222288 A | 6/2012 |
| TW | 201301081 A | 1/2013 |
| TW | 201314582 A | 4/2013 |
| WO | WO-2010/135809 A1 | 12/2010 |
| WO | WO-2012/041419 A1 | 4/2012 |
| WO | WO-2012173001 | 2/2015 |
| WO | WO-2015016864 | 2/2015 |
| WO | WO-2015076811 | 5/2015 |

OTHER PUBLICATIONS

Au et al., "Skeleton Extraction by Mesh Contraction," 2008, Proceedings for SIGGAPH 2008, 10 pages.

Bergh, M.V.D. et al., Combining RGB and ToF Cameras for Real-time 3D Hand Gesture Interaction, (Research Paper), Oct. 24, 2010, 7 pages.

Choi et al., "Extraction of the Euclidean skeleton based on a connectivity criterion," 2003, Pattern Recognition 36, No. 3, pp. 721-729.

Chung et al., "MirrorTrack—A Real-Time Multiple Camera Approach for Multi-touch interactions on Glossy Display Surfaces," 37th IEEE AIPR'08, pp. 1-5.

Fisher et at, "Skeletonization/Medial Axis Transform," Nov 26, 2012, <http://web.archive.org ~ 6 pages.

Gao, Rui et al; Microsoft Research—Mobile Surface; Microsoft Research; 2010; http://research.microsoft.com ~ 1 page.

Hand, Randall; Infinite Z Launches zSpace Virtual Holographic 3D Display for Designers; VizWorld.com; Dec. 13, 2011; 2 pages.

Harrison, B et al; Bringing Toys to Life: Intel Labs OASIS Project; Augmented Engineering; Jan. 26, 2011; 1 page.

Harrison, Chris et al; OmniTouch: Wearable Multitouch Interaction Everywhere; UIST'11; Oct. 16, 2011; 10 pages.

Hartmann, Bjorn et al; Pictionaire: Supporting Collaborative Design Work by Integrating Physical and Digital Artifacts; CSCW 2010; Feb. 6, 2010 ~ 4 pages.

Hinckley, Ken et al; Pen + Touch = New Tools; UIST'10; Oct. 3, 2010 ~ 10 pages.

Junuzovic, Sasa et al; Microsoft Research—IllumiShare; Microsoft Research 2012; http://delivery.acm.org ~ 2 pages.

Kane, Shaun K. et al; Bonfire: A Nomadic System for Hybrid Laptop—Tabletop Interaction; UIST'09; Oct. 4, 2009 ~ 10 pages.

Katz, I. et al., A Multi-touch Surface Using Multiple Cameras, (Research Paper), Jun. 3, 2007, http://wsnl2.stanford.edu ~ 12 pages.

Linder, Natan et al; LuminAR: Portable Robotic Augmented Reality Interface Design and Prototype; UIST'10, Oct. 3, 2010; 2 pages.

Litomisky, K., Consumer RGB-D Cameras and Their Applications, (Research Paper), Jul. 13, 2012 ~ 20 pages.

Melanson, Donald; Microsoft Research Working on Portable Surface; Mar. 2, 2010; http://www.engadget.com ~ 2 pages.

Melanson, Donald; Wiimote Repurposed for Multi-Point Interactive Whiteboard; Dec. 10, 2007; http://www.engadget.com ~ 2 pages.

Salamati et al., "Semantic image Segmentation Using Visible and Near-Infrared Channels," Jan. 2012, Computer Vision—ECCV 2012, pp. 461-471.

Sato et at, "TEASAR: Tree-structure Extraction Algorithm for Accurate and Robust Skeletons," 2000, Proc 8th Pacific Conf Computer Graphics and Applications, 6 pages.

Shahram et al., "C-Slate: A Multi-Touch and Object Recognition System for Remote Collaboration using Horizontal Surfaces," IEEE International Workshop, 2007, 8 pgs.

(56) References Cited

OTHER PUBLICATIONS

Sidik et al., A Study on Natural Interaction for Human Body Motion Using Depth Image Data, (Research Paper), May 15-16, 2011, pp. 97-102.
Simonite, Tom; A Kitchen Countertop With a Brain; MIT Technology Review; Jul. 2, 2010; ~ 2 pages.
SoftKinetic, "DS525 Datasheet," Short Range Module, Mar. 8, 2013, <http://www.tiii.be ~ 2 pages.
Sturm, J. et al., "Towards a benchmark for RGB-D SLAM evaluation," Jun. 2011, RGB-D Workshop ~RSS ~ 2 pages.
Van den Bergh et al., "Haarlet-based hand gesture recognition for 3D interaction," IEEE WACV 2009, Dec. 2009 ~ 9 pages.
Westerman, W., Hand Tracking, Finger Identification, and Chordic Manipulation on a Multi-touch Surface, (Research Paper), Sep. 2, 2003 ~ First 30 pages of 363 pages.
Wikipedia, "Sensor fusion," Jul. 31, 2013, <https://en.wikipedia.org ~ 4 pages.
Wikipedia, "Leap Motion," Aug. 15, 2013, retrieved from: <http://en.wikipedia.org/wiki/Leap_Motion> ~ 3 pages.
Wilson, Andrew D. et al; Combining Multiple Depth Cameras and Projectors for Interactions on, Above, and Between Surfaces; UIST'10; Oct. 3, 2010; 10 pages.
Wilson, Andrew D.; Using a Depth Camera as a Touch Sensor; ITS 2010: Devices & Algorithms; Nov. 7, 2010 ~ 4 pages.
Hanping, Mao et al., "Image segmentation method based on multi-spectral image fusion and morphology reconstruction", Jun. 2008, Transactions of the CSAE, vol. 24, No. 6.

\* cited by examiner

US 10,156,937 B2

DETERMINING A SEGMENTATION BOUNDARY BASED ON IMAGES REPRESENTING AN OBJECT

BACKGROUND

Many computing systems include at least one display and at least one input device. The display may include, for example, a monitor, a screen, or the like. Example input devices include a mouse, a keyboard, a touchpad, or the like. Some computing systems include a touch-sensitive display to both display output of the computing system and receive physical (e.g., touch) input.

BRIEF DESCRIPTION OF THE DRAWINGS

The following detailed description references the drawings, wherein.

DETAILED DESCRIPTION

Figure 1:
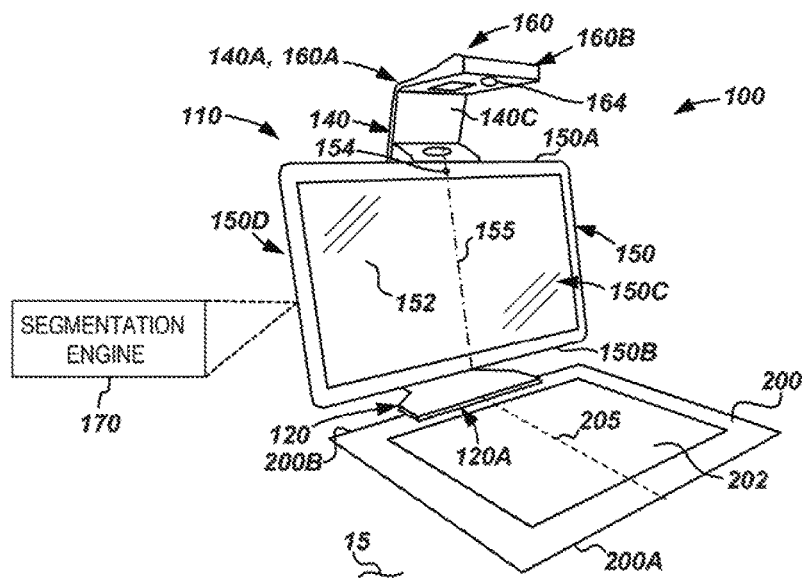
FIG. 1 is a schematic perspective view of an example computing system comprising a segmentation engine.

In addition to the input devices mentioned above, a camera is another example of an input device for a computing system. In some examples, a computing system may capture video or a still image with the camera. The video or still image may be stored or provided to another computing system via a suitable computer network. In other examples, an image captured by the camera may be analyzed, and the computing system may utilize the content of the image as input to the computing system. For example, the computing system may analyze an object represented in the captured image, and determine input to the computing system based on characteristics (e.g., location, position, orientation, shape, etc.) of the object represented in the image.

In such examples, the computing system may perform a process on the captured image to extract an image of at least one foreground object represented in the captured image. This process may be referred to herein as "segmentation". In some examples, the result of such a segmentation process may be an image of the foreground object separated from at least a background represented in the captured image.

In some examples, a segmentation process may comprise determining a segmentation boundary for an object represented in a captured image. As used herein, a "segmentation boundary" for an object represented in an image may be information representing an estimate of which portion(s) of the image represent the object and which portion(s) of the image represent features other than the object (e.g., a background). In some examples, a segmentation boundary for an object represented in an image may include information representing at least one outer edge of the object as represented in the image. When performing a segmentation process, a computing system may use the segmentation boundary to extract an image of the object from a larger captured image (e.g., also representing portions of a background).

However, it may be difficult to accurately determine a segmentation boundary for an object based on an image captured by a single camera, as certain conditions may make it difficult to accurately distinguish the foreground object from the background in the image. For example, it may be difficult to accurately determine a segmentation boundary based on an image captured by a color camera (e.g., an RGB camera) in the presence of shadows, or when the foreground object and the background are very similar in color.

To address these issues, examples described herein may determine a segmentation boundary based on multiple images captured by cameras of different types. Examples described herein may include an infrared (IR)-absorbing surface, and an IR camera disposed above and pointed at the IR-absorbing surface to capture IR image representing an object disposed between the IR camera and the IR-absorbing surface based on IR light reflected by the object. Examples may also include an RGB camera to capture an RGB image representing the object disposed between the RGB camera and the IR-absorbing surface, and a segmentation engine to determine a segmentation boundary representing at least one outer edge of the object based on the IR image and the RGB image.

By using multiple images from cameras of different types, examples described herein may more accurately determine a segmentation boundary, as conditions affecting segmentation performed on images from one type of camera may not affect segmentation on images from camera of a different type. For example, an image captured by an IR camera may not be affected by either shadows or color similarity. Additionally, examples described herein may capture images of objects over an IR-absorbing surface, which may increase the contrast between the background (e.g., the IR-absorbing surface) and foreground objects exhibiting greater reflection of IR light, which may thereby improve segmentation performed based, at least in pert, on IR images captured with the IR-absorbing surface as the background.

Referring now to the drawings. FIGS. 1-7A are schematic views of an example computing system 100 comprising a segmentation engine 170. In some examples, segmentation engine 170 may to determine a segmentation boundary representing at least one outer edge of an object based on captured IR and RGB images, as described above. In the example of FIGS. 1-7A, system 100 generally comprises a support structure 110, a computing device 150, a projector unit 180, and an IR-absorbing surface 200.

Computing device 150 may comprise any suitable computing device complying with the principles disclosed herein. As used herein, a "computing device" may comprise an electronic display device, a smartphone, a tablet, a chip set, an al-in-one computer (e.g., a device comprising a display device that also houses processing resource(s) of the computer), a desktop computer, a notebook computer, workstation, server, any other processing device or equipment, or a combination thereof. In this example, device 150 is an all-in-one computer having a central axis or center line 155, a first or top side 150A, a second or bottom side 150B axially opposite the top side 150A, a front side 150C extending axially between sides 150A and 150B, a rear side 150D also extending axially between sides 150A and 150B and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
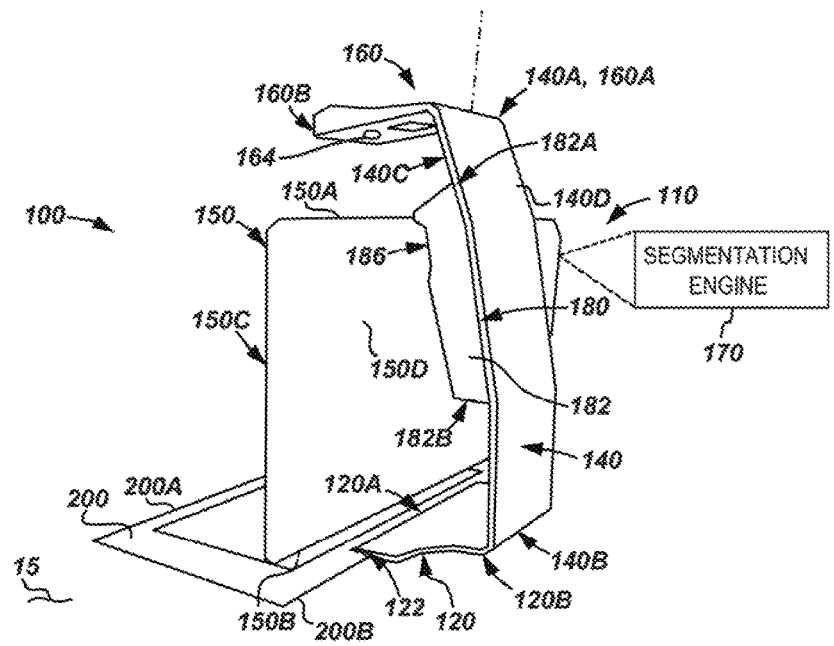
FIG. 2 is another schematic perspective view of the example computing system of FIG. 1.

In the example of FIGS. 1-7A, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, unit 180, device 150, top 160, etc.). In some examples, base 120 may engage with support surface 15 in this manner when system 100 is configured for operation. In the example of FIGS. 1-7A, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of IR-absorbing surface 200 may be disposed in (e.g., received within) the space formed between portion 122 and surface 15. In such examples, placing a portion of surface 200 within the space created by portion 122 and surface 15 may assist with the proper alignment of surface 200. In other examples, other suitable methods or devices may be used to assist with the alignment of surface 200.

Upright member 140 includes a first or upper end 140A, a second or lower end 140B opposite the upper end 140A, a first or front side 140C extending between the ends 140A and 140B, and a second or rear side 140D opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top. In some examples, base 120, member 140, and top 160 may be monolithically formed. In other examples, two or more of base 120, member 140, and top 160 may be formed of separate pieces (i.e., not monolithically formed).

IR-absorbing surface 200 may include a central axis or centerline 205, a first or front side 200A, and a second or rear side 200B axially opposite the front side 200A. In the example of FIGS. 1-7A, surface 200 may comprise a touch-sensitive region 202 substantially aligned with axis 205. Region 202 may comprise any suitable technology for detecting physical contact (e.g., touch input), as described above. For example, touch-sensitive region 202 may comprise any suitable technology for detecting (and in some examples tracking) one or multiple touch inputs by a user to enable the user to interact, via such touch input, with software being executed by device 150 or another computing device. In the example of FIGS. 1-7A, region 202 extends over less than all of surface 200. In other examples, region 202 may extend over substantially all of surface 200 (e.g., may be substantially coterminous with surface 200). In examples described herein, IR-absorbing surface 200 may be any suitable IR-absorbing planar object, such as an IR-absorbing mat (e.g., an IR-absorbing, touch-sensitive mat), tabletop, sheet, etc. In some examples, IR-absorbing surface 200 may be disposed horizontal (or approximately or substantially horizontal). For example, surface 200 may be disposed on support surface 15, which may be horizontal (or approximately or substantially horizontal).

As described above, surface 200 may be aligned with base 120 of structure 110 to assist with proper alignment of surface 200 (e.g., at least during operation of system 100). In the example of FIGS. 1-7A, rear side 200B of surface 200 may be disposed between raised portion 122 of base 120 and support surface 15, such that rear end 200B is aligned with front side 120A of base 120 to assist with proper overall alignment of surface 200 (and particularly proper alignment of region 202) with other components of system 100. In some examples, surface 200 may be aligned with device 150 such that the center line 155 of device 150 is substantially aligned with center line 205 of surface 200. In other examples, surface 200 may be differently aligned with device 150.

In some examples, region 202 of surface 200 and device 150 may be communicatively connected (e.g., electrically coupled) to one another such that user inputs received by region 202 may be communicated to device 150. Region 202 and device 150 may communicate with one another via any suitable wired or wireless communication technology or mechanism, such as, for example, WI-FI. BLUETOOTH, ultrasonic technology, electrical cables, electrical leads, electrical conductors, electrical spring-loaded pogo pins with magnetic holding force, or the like, or a combination thereof. In the example of FIGS. 1-7A, exposed electrical contacts disposed on rear side 200B of surface 200 may engage with corresponding electrical pogo-pin leads within portion 122 of base 120 to communicate information (e.g., transfer signals) between device 150 and region 202 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of surface 200.

Figure 3:
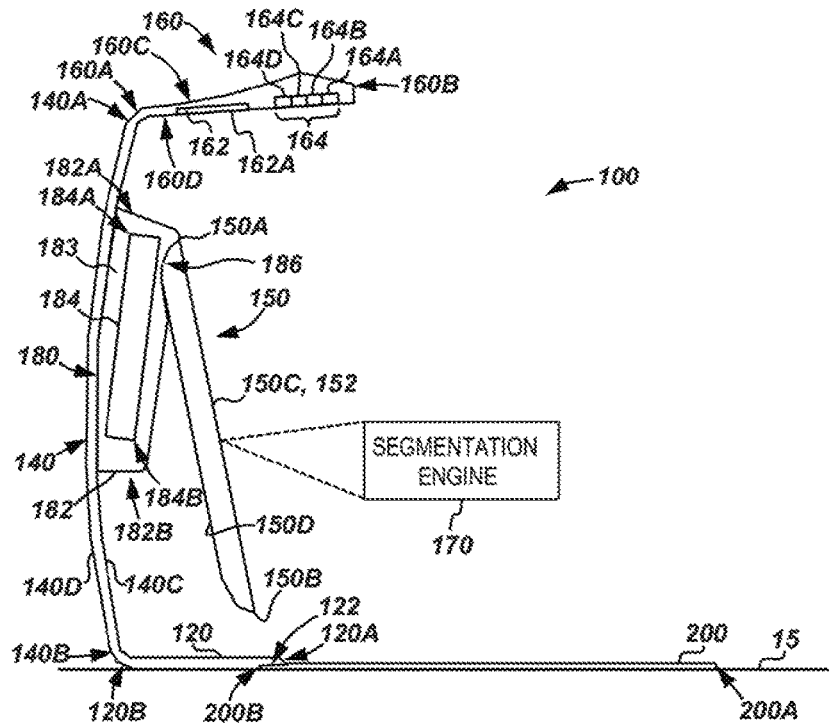
FIG. 3 is a schematic side view of the example computing system of FIG. 1.

Referring to FIG. 3, projector unit 180 comprises an outer housing 182, and a projector assembly 184 disposed within housing 182. Housing 182 includes a first or upper end 182A, a second or lower end 182B opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Figure 4:
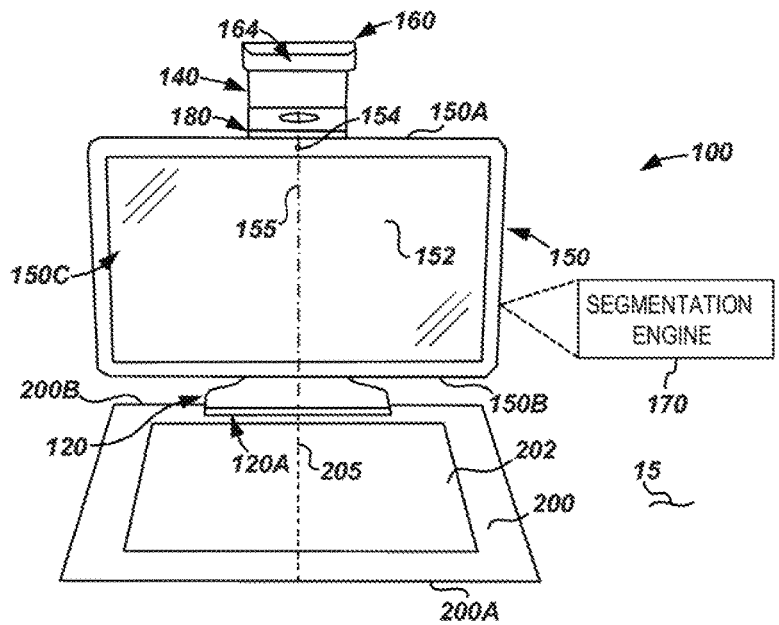
FIG. 4 is a schematic front view of the example computing system of FIG. 1.

Referring to FIG. 4, in some examples, when device 150 is suspended from structure 110 via mounting member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 is disposed within cavity 183 of housing 182, and includes a first or upper end 184A, a second or lower end 1848 opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting image(s) (e.g., out of upper end 184A) that correspond with that input data. For example, in some implementations, projector assembly 184 may comprise a digital light processing (DLP) projector or a liquid crystal on silicon (LCoS) projector which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 150 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, an ultrasonic connection, or a combination thereof. In the example of FIGS. 1-7A, device 150 is communicatively connected to assembly 184 through electrical leads or conductors (e.g., as described above in relation to surface 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162A that is disposed along bottom surface 160O of top 160 and is positioned to reflect light, image(s), etc., projected from upper end 184A of projector assembly 184 toward surface 200 during operation. Mirror 162 may comprise any suitable type of mirror or reflective surface. In the example of FIGS. 1-7A, fold mirror 162 may comprise a standard front surface vacuum metalized aluminum coated glass mirror that acts to fold light emitted from assembly 184 down to surface 200. In other examples, mirror 162 may have a complex aspherical curvature to act as a reflective lens element to provide additional focusing power or optical correction.

Sensor bundle 164 includes a plurality of sensors (e.g., cameras, or other types of sensors) to detect, measure, or otherwise acquire data based on the state of (e.g., activities occurring in) a region between sensor bundle 164 and surface 200. The state of the region between sensor bundle 164 and surface 200 may include object(s) on or over surface 200, or activit(ies) occurring on or near surface 200. In the example of FIG. 3, bundle 164 includes an RGB camera 164A (or another type of color camera 164A), an IR camera 164B, a depth camera (or depth sensor) 164C, and an ambient light sensor 164D.

In some examples, RGB camera 164A may be a camera to capture color images (e.g., at least one of still images and video). In some examples, RGB camera 164A may be a camera to capture images according to the RGB color model, which may be referred to herein as "RGB images". In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RBG camera 164A may capture images with a different resolution. In some examples, RGB camera 164A may be pointed toward surface 200 and may capture image(s) of surface 200, object(s) disposed between surface 200 and RGB camera 164A (e.g., on or above surface 200), or a combination thereof.

IR camera 164B may be a camera to detect intensity of IR light at a plurality of points in the field of view of the camera 164B. In examples described herein. IR camera 164B may operate in conjunction with an IR light projector 166 (see FIG. TA) of system 100 to capture IR images. In such examples, each IR image may comprise a plurality of pixels each representing an intensity of IR light detected at a point represented by the pixel. In some examples, top 160 of system 100 may include an IR light projector 166 (see FIG. 7A) to project IR light 167 toward surface 200 and IR camera 164B may be pointed toward surface 200. In such examples, IR camera 164B may detect the intensity of IR light reflected by surface 200, object(s) disposed between surface 200 and IR camera 164B (e.g., on or above surface 200), or a combination thereof. In some examples, IR camera 164B may exclusively detect IR light 167 projected by IR light projector 166 (e.g., as reflected from surface 200, object(s), etc., or received directly).

As noted above, surface 200 may be an IR-absorbing surface 200. In examples described herein, an "IR-absorbing" surface may be a surface to at least partially absorb projected IR light such that an IR camera (e.g., IR camera 164B) may detect significantly less intensity of IR light reflected from the IR-absorbing surface than from a non-IR-absorbing object under the same IR light projection conditions. For example, an IR-absorbing surface may be a surface including, coated with, or otherwise prepared with an IR light absorbing substance (e.g., ink) to at least partially absorb IR light such that an IR camera may detect significantly less intensity of IR light reflected from the IR-absorbing surface than from another object not including, coated with, or otherwise prepared with such an IR absorbing substance. In some examples, the IR absorbing substance may be substantially transparent to visible light. In some examples, IR-absorbing surface 200 may appear white. In such examples, it may be difficult to detect the edges of a sheet of white paper from an RGB image of the white paper disposed on the white surface 200. In examples described herein, IR camera 184B may capture an IR image of the sheet of paper on surface 200 (e.g., as a background) in which the pixels of the IR image representing portions of the IR-absorbing background have significantly lower IR light intensity values than pixels representing portions of the sheet of paper, such that the difference in intensity values provide sufficient contrast to reliably detect the edges of the sheet of paper in the IR image.

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164C) of a portion of an object at a point represented by the pixel. Depth camera 164C may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when an object (e.g., a three-dimensional object) is on surface 200. In some examples, depth sensor 164C may detect at least one of the presence, shape, contours, motion, and the respective distance(s) of an object (or portions thereof) placed on surface 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface sensor may include a pair of cameras which are arranged to stereoscopically track the location of a user input device (e.g., a stylus) as it is moved by a user about the surface 200 (e.g., about region 202 of surface 200). In other examples, the user interface sensor may additionally or alternatively include IR camera(s) or sensor(s) arranged to detect infrared light that is either emitted or reflected by a user input device.

In examples described herein, each of sensors 164A-1640 of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-7A, electrical conductors may be routed from bundle 164, through top 160, upright member 140, and projector unit 180 and into device 150 through leads that are disposed within mounting member 186 (as described above).

Figure 5:
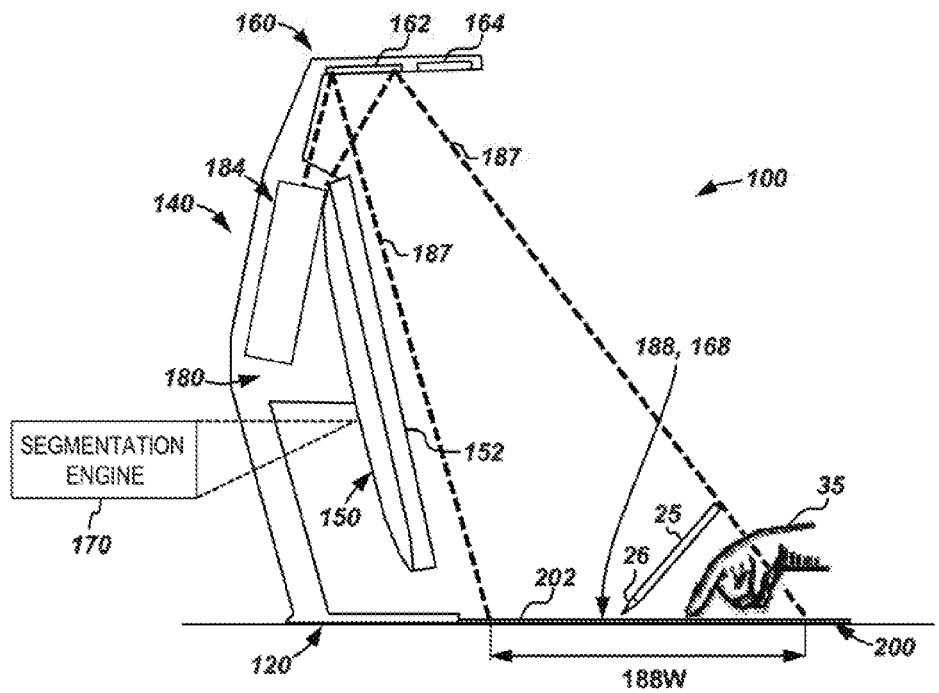
FIG. 5 is a schematic side view of the example computing system of FIG. 1 during an example operation.
Figure 6:
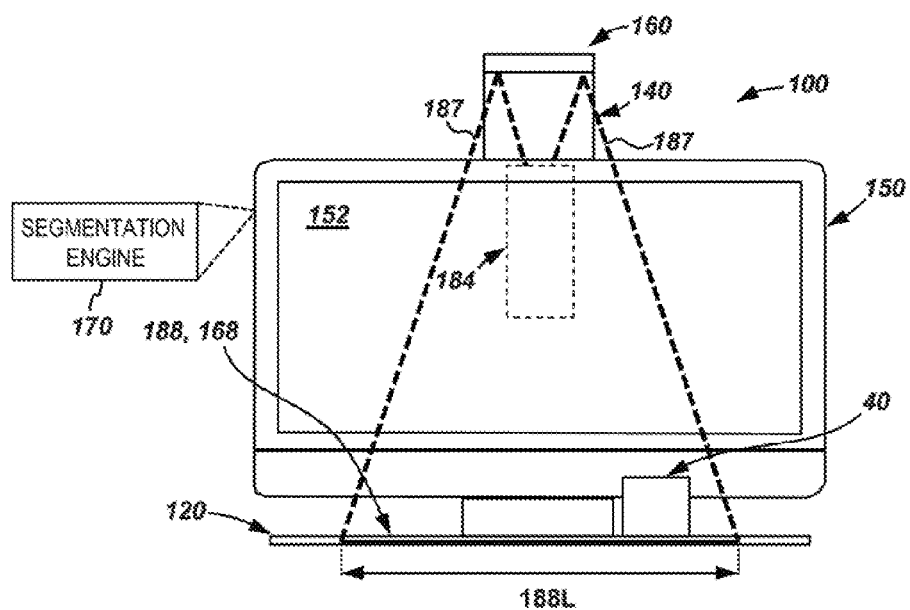
FIG. 6 is a schematic front view of the example computing system of FIG. 1 during an example operation.

Referring to FIGS. 5 and 6, during operation of system 100, projector assembly 184 may project visible light 187 to reflect off of mirror 162 towards surface 200 to thereby display visible image(s) on a projector display space 188 of surface 200. In the example of FIGS. 5-6, space 188 may be substantially rectangular, having a length 188L and a width 188W. In some examples, length 188L may be approximately 16 inches, while width 188W may be approximately 12 inches. In other examples, length 188L and width 188W may have different values.

Figure 7A:
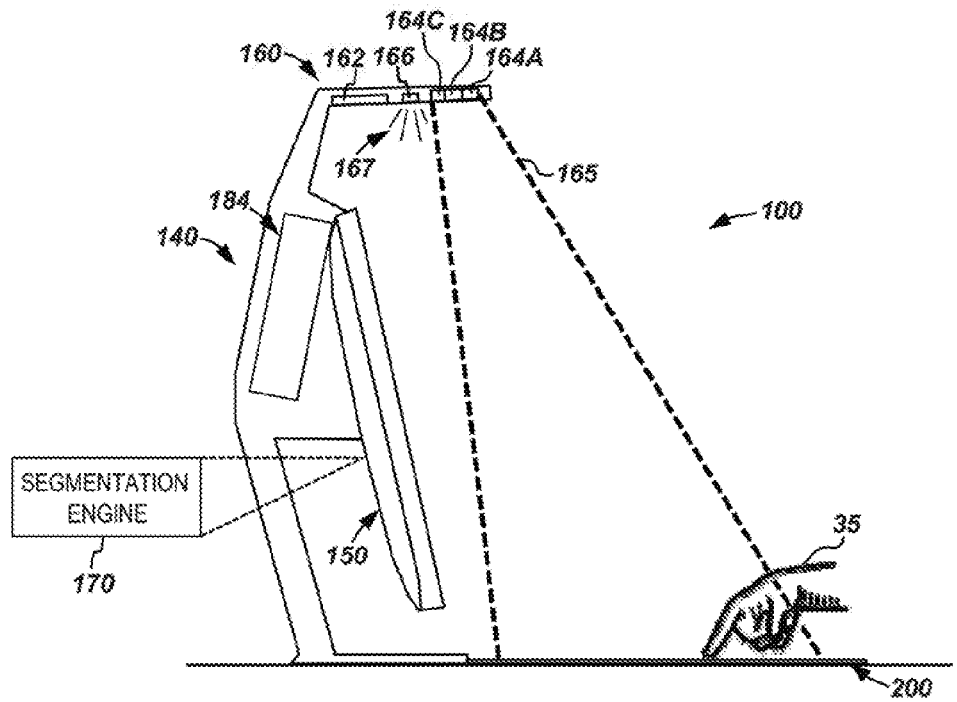
FIG. 7A is a schematic side view of the example computing system of FIG. 1 illustrating an example of image capturing.

In some examples, cameras 164A-164C of sensor bundle 164 are arranged within system 100 such that the field of view of each of cameras 164A-164C includes a space 168 of surface 200 that may overlap with some or all of display space 188 or may be coterminous with display space 188. In examples described herein, the field of view of cameras 164A-164C may be said to include space 168, though at times surface 200 may be at least partially occluded by object(s) on or over surface 200. In such examples, the object(s) on or over surface 200 may be in the field of view of at least one of cameras 164A-164C. In such examples, sensors of sensor bundle 164 may acquire data based on the state of (e.g., activities occurring in, object(s) disposed in) a region between sensor bundle 164 and space 168 of surface 200. In some examples, both space 188 and space 168 coincide or correspond with region 202 of surface 200 such that functionalities of touch sensitive region 202, projector assembly 184, and sensor bundle 164 are all performed in relation to the same defined area. A field of view 165 of cameras 164A-164C is schematically illustrated in FIG. 7A. In some examples, each of cameras 164A-164C may have a slightly different field of view.

Referring now to FIGS. 5-7A, device 150 may direct projector assembly 184 to project image(s) onto region 202 of surface 200. Device 150 may also display image(s) on display 152 (which may be the same as or different than the image(s) projected onto region 202 by projector assembly 184). The image(s) projected by assembly 184 may comprise information and/or images produced by software being executed by device 150. In some examples, a user may interact with the image(s) projected on region 202 and displayed on display 152 by physically engaging the touch-sensitive region 202 of surface 200 in any suitable manner, such as with user's hand 35 (e.g., via touches, taps, gestures, or other touch input), with a stylus 25, or via any other suitable user input device(s). Touch-sensitive region 202 may detect such interaction via physical engagement with region 202. Also, in some examples, assembly 184 may also project image(s) (at least partially) on objects disposed over surface 200 (e.g., hand 35, as shown in FIG. 5).

As an example, when a user interacts with region 202 of surface 200 (e.g., with a hand 35, as shown in FIG. 7A), touch-sensitive region 202 may generate touch input information and provide it to device 150 through any suitable connection (examples of which are described above). In some examples, the touch input information may be provided to an operating system (OS) executing on device 150, and may further be passed by to OS to another application (e.g., program, etc.) executing on device 150. In response, the executing OS or application may alter image(s) projected by projector assembly 184, image(s) displayed on display 152, or a combination thereof. As used herein, an "application" (or "computer application") is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.).

In some examples, sensors of sensor bundle 164 may also generate system input which may be provided to device 150 for further processing. For example, system 100 may utilize at least sensor(s) of bundle 164 and segmentation engine 170 detect at least one of the presence and location of a user's hand 35 (or a stylus 25, as shown in FIG. 5), and provide system input information representing the detected information to device 150. The provided system input information may be passed to at least one of an OS and application being executed by device 150, and may alter image(s) displayed by system 100, as described above in relation to touch input. For example, bundle 164 may include a pair of cameras or sensors that are arranged to perform stereoscopic stylus tracking (e.g., of stylus 25). In other examples, stylus 25 includes a tip 26 coated with an infrared retro-reflective coating (e.g., paint) such that tip 26 may serve as an infrared retro-reflector. In such examples, bundle 164 may include IR camera(s) (or sensor(s)), as described above, which detect IR light that is reflected off of tip 26 to enable device 150 to track the location of tip 26 as it moves across region 202. In some examples, region 202 (with image(s) projected on it by assembly 184) may serve as a second or alternative touch-sensitive display within system 100. In addition, detection of interaction with image(s) displayed on region 202 may be enhanced through use of sensors of sensor bundle 164 as described above.

In some examples, system 100 may capture two-dimensional (2D) image(s) or create a three-dimensional (3D) scan of a physical object such that an image of the object may then be projected onto region 202 for further use and manipulation thereof. For example, as shown in FIG. 6, an object 40 may be placed on region 202 such that sensors of bundle 164 (e.g., at least one of cameras 164A-164C) may detect at least one of the location, dimensions, and color of object 40, to enhance the 2D image(s) or create the 3D scan thereof. In such examples, the information gathered by the sensors of bundle 164 may be provided to device 150 (e.g., an OS, application, etc.), as described above. In some examples, after receiving the information, device 150 (e.g., the OS, application, etc.) may direct projector assembly 184 to project an image of object 40 onto region 202. Object 40 may be, for example, a smartphone, a book, a document, a photo, or any other physical object. In some examples, once object(s) are scanned by sensors of bundle 164, the background of the image representing the object may be removed (e.g., via a segmentation process as described above), and the resulting image of the foreground object may be projected onto region 202 (or shown on display 152). In such examples, images of physical objects (e.g., an object 40) may be captured, processed, and displayed on region 202 to quickly and easily create a digital version of the physical object to allow for further manipulation thereof.

Figure 7B:
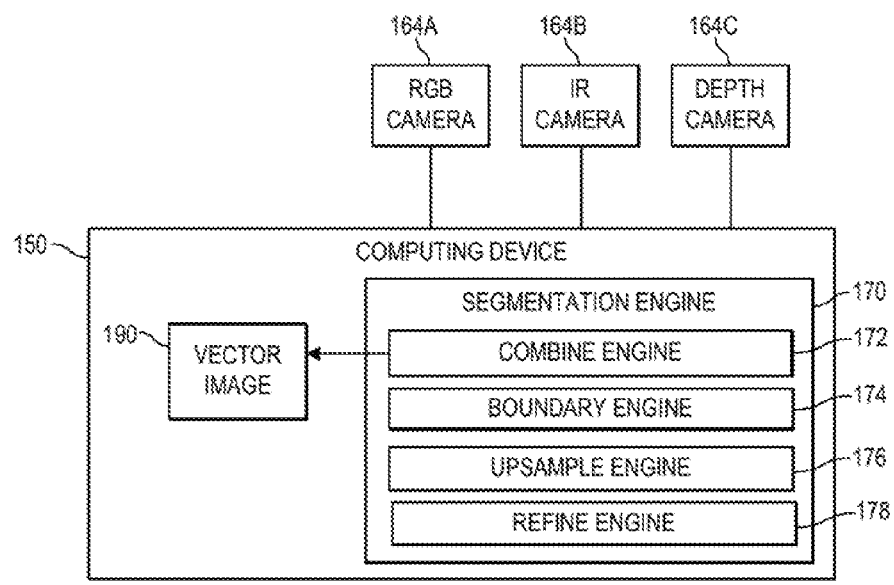
FIG. 7B is a block diagram of an example portion of the computing system of FIG. 1 comprising the segmentation engine.

FIG. 7B is a block diagram of a portion of computing system 100 of FIG. 1 comprising segmentation engine 170. In particular, FIG. 7B illustrates an example of computing device 150 that comprises segmentation engine 170 and is communicatively connected to cameras 164A-164C (as described above). Although not shown in FIG. 7B, computing device 150 may also be communicatively connected to other components of system 100, as described above. In the example of FIG. 7B, segmentation engine 170 includes engines 172, 174, 176, and 178. In some examples, engine 170 may include additional engine(s).

Computing device 150 (or any other computing device implementing segmentation engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Each of engines 170, 172, 174, 176, 178, and any other engines of computing device 150, may be any combination of hardware and programming to implement the functionalities of the respective engine. Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement the engines. The machine-readable storage medium storing the instructions may be integrated in the same computing device (e.g., device 150) as the processing resource to execute the instructions, or the machine-readable storage medium may be separate from but accessible to the computing device and the processing resource. The processing resource may comprise one processor or multiple processors included in a single computing device or distributed across multiple computing devices.

In some examples, the instructions can be part of an installation package that, when installed, can be executed by the processing resource to implement the engines of system 100. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

Figure 7C:
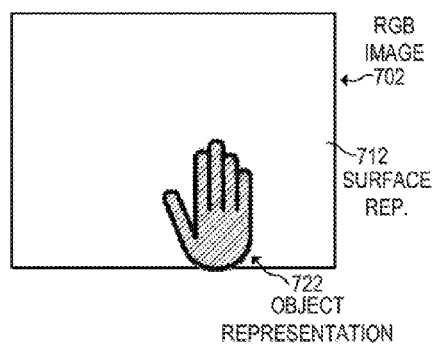
FIG. 7C is a schematic diagram of an example RGB image captured by the example computing system of FIG. 1.

Examples of segmentation engine 170 are described below in relation to FIGS. 7A-7G. Referring to FIGS. 7A and 78, computing system 100 comprises IR-absorbing surface 200 and computing device 150. Computing system 100 also includes RGB camera 164A, IR camera 164B, and depth camera 164C, each disposed above and pointed at IR-absorbing surface 200. RGB camera 164A may capture an RGB image 702 (see FIG. 7C) representing object 35 disposed between RGB camera 164A and IR-absorbing surface 200. In such examples, RGB image 702 may include an RGB representation 722 of object 35 and an RGB representation 712 of IR-absorbing surface 200, which may be different colors (as shown in FIG. 7C by the presence or absence of hatching). In some examples, RGB camera 164A may be a high-resolution RGB camera and the captured RGB image 702 may be a high-resolution RGB image. For example, as described above, RGB camera may have a resolution on the order of multiple megapixels (e.g., 14 MPs), and may capture RGB images with a resolution of multiple megapixels (e.g., 14 MPs). Although, as shown in FIG. 7A, the object 35 disposed between cameras 164A-164C and surface 200 is a hand 35, in other examples the object may be any other suitable object.

Figure 7D:
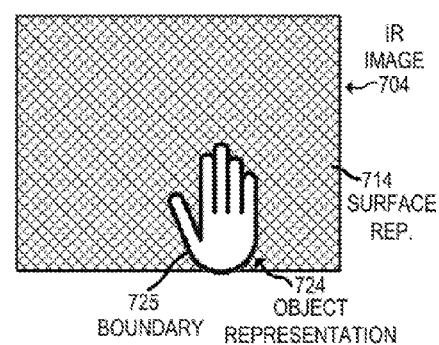
FIG. 7D is a schematic diagram of an example infrared (IR) image captured by the example computing system of FIG. 1.

IR camera 164B may capture an IR image 704 (see FIG. 70), representing object 35 disposed between IR camera 164B and IR-absorbing surface 200, based (at least in part) on IR light 167 reflected by object 35 disposed between IR camera 164B and IR-absorbing surface 200. In such examples, IR image 704 may include a representation 724 of object 35 and a representation 714 of IR-absorbing surface 200. In the example of FIGS. 7A-7F in which object 35 is not IR-absorbing, IR camera 164B detects a significantly lesser intensity of IR light 167 reflected from IR-absorbing surface 200 than from object 35 (i.e., IR camera 164B detects a significantly higher intensity of IR light 167 reflected from object 35 than from IR-absorbing surface 200). In such examples, portions of IR image 704 representing IR-absorbing surface 200 (i.e., surface representation 714) include IR light intensity values that are significantly smaller than the higher IR light intensity values included in the portions of IR image 704 representing object 35 (i.e., object representation 724). In the example of FIG. 7D, the cross-hatching represents the portions of IR image 704 having lesser IR light intensity values due to IR-absorbing surface 200 (i.e., surface representation 714), and the absence of cross-hatching represents the portions of IR image 704 having higher IR light intensity values (i.e., object representation 724). FIG. 7D also illustrates a boundary 725 between the lesser IR light intensity values of surface representation 714 and the greater IR light intensity values of object representation 724.

Figure 7E:
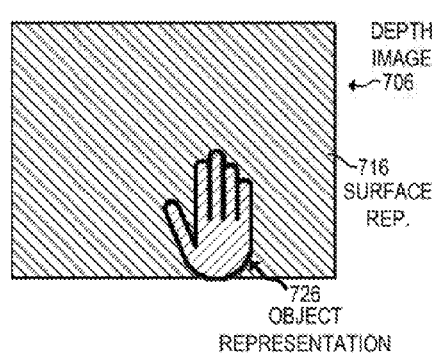
FIG. 7E is a schematic diagram of an example depth image captured by the example computing system of FIG. 1.

Depth camera 164C may capture a depth image 706 (see FIG. 7E) representing object 35 disposed between depth camera 164C and IR-absorbing surface 200. In such examples, depth image 706 may include a representation 726 of object 35 and a representation 716 of IR-absorbing surface 200. In the example of FIGS. 7A-F in which object 35 is disposed over surface 200, depth camera 164C detects that object 35 is closer to depth camera 164C than is surface 200. In such examples, depth image 706 includes greater distance (or depth) values for portions of depth image 706 representing surface 200 (i.e., surface representation 716) and lesser distance values for portions of image 706 representing object 35 (i.e., object representation 726). In FIG. 7E, the differences in distance values are represented by different hatching.

In some examples, IR camera 164B may be a low-resolution IR camera, and captured IR image 704 may be a low-resolution IR image. Also, in some examples, depth camera 164C may be a low-resolution depth camera and captured depth image 706 may be a low-resolution depth image. For example, one or both of IR camera 164B and depth camera 164C may have video graphics array (VGA) resolution, quarter video graphics array (QVGA) resolution, or any other resolution that is significantly less than the resolution of RGB camera 164A. In such examples, the captured IR and depth images 704 and 706 may have the resolution of the camera that captured it (e.g., VGA resolution, QVGA resolution, etc.).

In some examples described herein, the "resolution" of a camera or image may refer to a two-dimensional pixel resolution of the camera or image. Such a two-dimensional pixel resolution may be expressed as A pixels×B pixels, where A and B are positive integers. In examples described herein, a "low-resolution" camera of a computing system may be a camera having a significantly lower resolution than another camera of the computing system, and a "low-resolution" image captured by a camera of the computing system may be an image with a significantly lower resolution than an image capable of being captured with another camera of the computing system. Additionally, in examples described herein, a "high-resolution" camera of a computing system may be a camera having a significantly higher resolution than another camera of the computing system, and a 'high-resolution' image captured by a camera of the computing system may be an image with a significantly higher resolution than a maximum resolution of images capable of being captured with another camera of the computing system. For example, computing system 100 may comprise a low-resolution IR camera 164B to capture a low-resolution IR image 704, a low-resolution depth camera 164C to capture a low-resolution depth image 706, and a high-resolution RGB camera 164A to capture a high-resolution RGB image 702.

In some examples, the two-dimensional pixel resolution of RGB camera 184A and RGB images captured by it (including RGB image 702, for example) may be at least ten times greater, in each dimension, than the two-dimensional pixel resolution of IR camera 164B and IR images captured by it (including IR image 704, for example). For example, IR camera 164B and IR images captured by it may have a resolution of approximately 320 pixels×240 pixels, while RGB camera 164A and RGB images captured by it may have a resolution of approximately 4416 pixels×3312 pixels. In other examples, the cameras and images may have different resolutions.

In some examples, the two-dimensional pixel resolution of RGB camera 164A and RGB images captured by it may also be at least ten times greater. In each dimension, than the two-dimensional pixel resolution of depth camera 164C and depth images captured by it (including depth image 706, for example). For example, depth camera 164C and depth images captured by it may have a resolution of approximately 320 pixels×240 pixels, while RGB camera 164A and RGB images captured by it may have a resolution of approximately 4416 pixels×3312 pixels. In other examples, the cameras and images may have different resolutions.

Figure 7F:
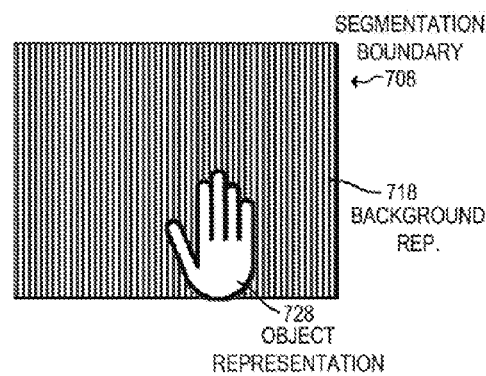
FIG. 7F is a schematic diagram of an example segmentation boundary determined by the segmentation engine.

In some examples, segmentation engine 170 may determine a segmentation boundary 708 based on captured IR image 704, captured depth image 706, and captured RGB image 702. A schematic diagram of an example segmentation boundary 708 is illustrated in FIG. 7F. In the example of FIG. 7F, segmentation boundary 708 for object 35 represented at least one image (e.g., RGB image 702) may be information representing an estimate of which portion(s) of the image represent the object and which portion(s) of the image represent features other than the object (e.g., a background). For example, segmentation boundary 708 includes an estimate that object representation 728 (illustrated without hatching) corresponds to the portion of the image (e.g., of image 702) that represents the object, and that background representation 718 (illustrated with vertical hatching) corresponds to the portion of the image that represent feature(s) other than the object (e.g., surface 200).

In some examples, computing device 150 may use segmentation boundary 708 to extract an image of object 35 from a captured image representing more than object 35 (e.g., RGB image 702). For example, computing device 150 may extract the portion of RGB image 702 corresponding to object representation 728 of segmentation boundary 708 to obtain a segmented image of the portion of RGB image 702 representing object 35. In the example of FIGS. 7A-7F, the resulting segmented image may be the portion of image 702 representing object 35 with the portions of image 702 representing other (e.g., background) feature(s) subtracted out. In such examples, the resulting segmented image may correspond to object representation 722 of RGB image 702. In examples described herein, a segmentation boundary may be represented in any suitable form, format, data structure, or the like. For example, a segmentation boundary may be represented as a binary mask indicating, for each pixel of a corresponding image (e.g., image 702), whether the pixel represents a portion of the object or not. In some examples, a segmentation boundary may correspond to more than one image (e.g., images 702, 704, and 706), and indicate for each the portions corresponding to the object.

In some examples, cameras 164A-164C may be at different physical locations. As such, cameras 164A-164C may capture respective images of the same scene (e.g., viewing surface 200 from above) from slightly different angles. In such examples, segmentation engine 170 may geometrically align images 702, 704, and 706 captured by cameras 164A-164C. For example, segmentation engine 170 may construct at least one homography (or other mapping(s)) for the pixels of cameras 164A-164C such that pixels corresponding to the same image features (e.g., object 35) may be identified in each of images 702, 704, and 706. The homography or other mapping may be determined in any suitable manner. In some examples, segmentation engine 170 may map the pixels of each of images 702, 704, and 706 to a common set of coordinates to geometrically align the images. In some examples, engine 170 may perform such geometric alignment prior to performing other functionalities for a segmentation process described below in relation to engines 172, 174, 176, and 178.

In the example of FIG. 7B, segmentation engine 170 may include a combine engine 172, a boundary engine 174, an upsample engine 176, and a refine engine 178. Combine engine 172 may combine IR image 704 and depth image 706 into a single vector image 190. Vector image 190 may comprise a plurality of pixels, each including IR intensity data from a corresponding pixel of IR image 704 and distance (or depth) data from a corresponding pixel of depth image 706. In such examples, each pixel of vector image 190 comprises two components of information. In some examples, vector image 190 may have approximately the same two-dimensional pixel resolution as IR and depth images 704 and 706.

Boundary engine 174 may determine a preliminary segmentation boundary for object 35 based on vector image 190. For example, engine 174 may analyze vector image 190 to estimate the location of edges of object 35 represented in vector image 190, based on the IR intensity and distance data at the pixels of vector image 190 to determine the preliminary segmentation boundary. The preliminary segmentation boundary may be a segmentation boundary, as described above, and may be represented in any suitable manner as described above. Engine 174 may perform the edge estimation (or edge detection) process in any suitable manner.

As an example, engine 174 may run a gradient filler over both the IR intensity and distance data of vector image 190 to detect portions of vector image 190 having relatively high gradient magnitudes to estimate at least the edge(s) of object 35. In such examples, engine 174 may determine the preliminary segmentation boundary based at least in part on at least one boundary 725 between the lesser IR light intensity values of IR image 704 (e.g., of surface representation 714) and the greater IR light intensity values of IR image 704 (e.g., of object representation 724). As described below, segmentation boundary 708 may be determined based on the preliminary segmentation boundary. As such, segmentation engine 170 may determine segmentation boundary 708 based at least in part on at least one boundary 725 between the lesser IR light intensity values of image 704 and the greater IR light intensity values of image 704.

In some examples, engine 174 may utilize the IR intensity and distance data together in any suitable manner. For example, engine 174 may estimate that a portion of vector image 190 represents an edge of object 35 if either one of IR intensity data and the distance data suggests (or otherwise indicates) the presence of an edge. In other examples, engine 174 may not estimate that a portion of vector image 190 represents an edge of object 35 unless both the IR intensity data and the distance data suggests (or otherwise indicates) the presence of an edge. In some examples, engine 174 may additionally or alternatively utilize various heuristic(s), rule(s), or the like, for estimating the presence of edges of object 35 based on the IR intensity and distance data of vector image 190.

In some examples, the preliminary segmentation boundary may have (or otherwise correspond to) the two-dimensional pixel resolution of at least one of IR image 704 and depth image 706 (i.e., a low resolution relative to RGB image 702). For example, the preliminary segmentation boundary may have approximately a VGA resolution (e.g., 640 pixels×480 pixels), a QVGA resolution (e.g., 320 pixels×240 pixels), or another low resolution relative to the resolution of RGB image 702. In such examples, upsample engine 176 may upsample the preliminary segmentation boundary to the resolution of RGB image 702 (described above), or to approximately that resolution. Engine 176 may upsample the preliminary segmentation boundary in any suitable manner. For example, engine 176 may scale up the preliminary segmentation boundary from the relatively low initial resolution to the relatively high resolution of RGB image 702 (or approximately that resolution). In such examples, engine 176 may scale up the preliminary segmentation boundary such that the determined preliminary segmentation boundary is represented with the higher number of pixels of the relatively high resolution of RGB image 702 (or approximately that resolution).

In some examples, the higher-resolution RGB image 702 may include greater may represent at least some portions of edge(s) of object 35 with more detail than either IR image 704 or depth image 706. As such, RGB image 702 may be used to improve the accuracy of the upsampled preliminary segmentation boundary for object 35 and thereby produce segmentation boundary 708. For example, refine engine 178 may refine the upsampled preliminary segmentation boundary based on RGB image 702 to obtain segmentation boundary 708. For example, engine 178 may filter or otherwise alter the upsampled preliminary segmentation boundary based on RGB image 702 in any suitable manner. As examples, engine 178 may utilize a bi-lateral filtering technique or a cross bi-lateral filtering technique to filter the upsampled preliminary segmentation boundary based on RGB image 702.

In other examples, segmentation engine 170 may determine segmentation boundary 708 in another manner. For example, after engine 170 geometrically aligns images 702, 704, and 706, upsample engine 176 may upsample the relatively low resolution IR and depth images 704 and 706 to the relatively high resolution of RGB image 702 (or approximately that resolution). In such examples, combine engine 172 may combine RGB image 702 and the upsampled IR and depth images 704 and 706 into a single vector image. In such examples, the vector image may comprise five components of information at each pixel, including IR intensity data from the upsampled IR image 704, distance data from the upsampled depth image 706, and each of red, blue, and green values from the RGB image 702. In such examples, boundary engine 174 may determine segmentation boundary 708 based on the vector image, in any manner as described above in relation to the preliminary segmentation boundary, but using all five components of information in the vector image of this example.

In examples described herein, segmentation engine 170 may determine segmentation boundary 708 based on RGB, IR, and depth images 702, 704, and 706, as described above, and independent of (e.g., without reference to) any prior image of object 35 captured by any of RGB, IR, and depth cameras 164A-164C. In such examples, segmentation engine 170 does not rely on tracking object 35 over time (i.e., based on images taken by any of cameras 164A-164C over time) to determine segmentation boundary 708. Additionally, as noted above projection assembly 184 may project visible image(s) on IR-absorbing surface 200 and object 35. In such examples, segmentation engine 170 may determine segmentation boundary 708 based on RGB, IR, and depth, images 702, 704, and 706 captured during the projection of the visible image(s).

Figure 7G:
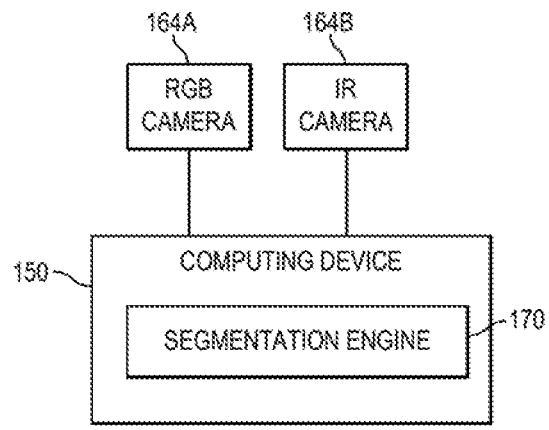
FIG. 7G is a block diagram of another example portion of the computing system of FIG. 1 comprising the segmentation engine.

In some examples, computing system 100 may omit at least one of cameras 164A-164C. FIG. 7G is another example portion of computing system 100 comprising segmentation engine 170. In particular, FIG. 7B illustrates an example of computing device 150 that comprises segmentation engine 170 and is communicatively connected to RGB camera 164A and IR camera 164B (as described above). In the example of FIG. 7G, computing system 100 may omit depth camera 164C. In such examples, segmentation engine 170 may determine segmentation boundary 708 representing at least one outer edge of object 35 based on IR image 704 and RGB image 702, captured by cameras 164B and 164A, respectively. In such examples, engine 170 may determine segmentation boundary 708 as described above in relation to engine 170, but without use of or reference to distance data of depth image 706. For example, segmentation engine 170 may determine a preliminary segmentation boundary based on IR image 704 (and not a vector image), which may be further processed by segmentation engine 170 to determine segmentation boundary 708, as described above. In some examples, features and functionalities described herein in relation to FIGS. 1-7G may be provided in combination with features and functionalities described herein in relation to any of FIGS. 8-10.

Figure 8:
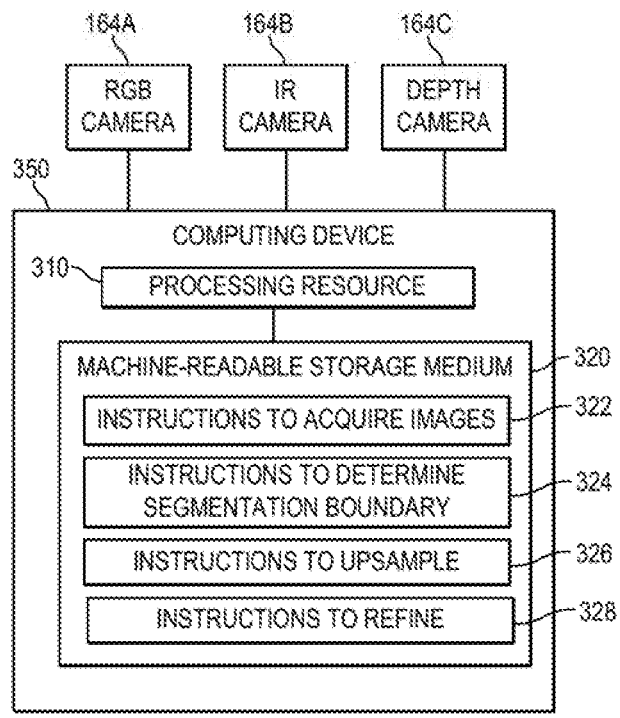
FIG. 8 is a block diagram of an example device to determine a segmentation boundary based on an RGB image, an IR image, and a depth image.

FIG. 8 is a block diagram of another example computing device 350 to determine a segmentation boundary based on an RGB image, an IR image, and a depth image. Computing device 350 may be another example implementation of device 150 described above in relation to FIGS. 1-7G. In the example of FIG. 8, computing device 350 is communicatively connected to cameras 164A-164C (as described above), and includes a processing resource 310, and a machine-readable storage medium 320 comprising (e.g., encoded with) instructions 322, 324, 326, and 328. In some examples, storage medium 320 may include additional instructions. In other examples, instructions 322, 324, 326, 328, and any other instructions described herein in relation to storage medium 320, may be stored on a machine-readable storage medium remote from but accessible to computing device 350 and processing resource 310. Processing resource 310 may fetch, decode, and execute instructions stored on storage medium 320 to implement the functionalities described below. In other examples, the functionalities of any of the instructions of storage medium 320 may be implemented in the form of electronic circuitry, in the form of executable instructions encoded on a machine-readable storage medium, or a combination thereof. Machine-readable storage medium 320 may be a non-transitory machine-readable storage medium.

In the example of FIG. 8, a computing system, such as computing system 100 described above in relation to FIGS. 1-7G, may comprise computing device 350 and cameras 164A-164C. In such examples, the computing system including computing device 350 may also include a horizontal (or approximately or substantially horizontal) IR-absorbing surface 200. As described above, IR camera 164B may capture an IR image 704 representing an object 35 disposed between IR camera 164B and IR-absorbing surface 200 based on IR light 167 reflected by object 35, and depth camera 164B may capture a depth image 706 representing respective distances of portions of object 35 disposed between depth camera 164B and IR-absorbing surface 200. Also as described above, an RGB camera 164A (or any other type of color camera 164A) may capture an RGB image 702 (or any other type of color image 702) representing object 35 disposed between RGB camera 164A and IR-absorbing surface 200. In some examples, RGB image 702 may have a higher resolution than each or IR image 704 and depth image 706, as described above.

In some examples, instructions 322 may acquire IR image 704 from IR camera 164B, acquire depth image 706 from depth camera 164C, and acquire RGB image 702 from RGB camera 164A. In examples described herein, instructions 322 may acquire the images from the camera actively (e.g., by retrieving, requesting, accessing, etc., the images) or passively (e.g., receiving the images, etc.).

In some examples, instructions 324 may geometrically align the images 702, 704, and 706 as described above prior to the functionalities described below in relation to computing device 350. In some examples, instructions 324 may determine a preliminary segmentation boundary for object 35 based on IR image data (e.g., IR intensity values of IR image 704) and depth image data (e.g., distance values of depth image 706), as described above in relation to engines 172 and 174. For example, instructions 342 may combine IR and depth images 704 and 706 into a single vector image (e.g., vector image 190 of FIG. 7B) comprising, for each pixel of the vector image, an IR intensity value from a corresponding pixel of IR image 704 and a depth value from a corresponding pixel of depth image 706. In such examples, instructions 324 may further detect edge(s) in the vector image based on both the IR intensity value and depth values at each pixel of the vector image, as described above.

Instructions 326 may upsample the preliminary segmentation boundary to the resolution of RGB image 702, and instructions 328 may refine the upsampled preliminary segmentation boundary based on RGB image 702 to obtain a segmentation boundary 708 for object 35, as described above in relation to engines 176 and 178. As described above, in some examples, the two-dimensional pixel resolution of RGB image 702 is at least ten times greater than the two-dimensional pixel resolution of IR image 704 in each dimension, and at least ten times greater than the two-dimensional pixel resolution of depth image 706 in each dimension. In other examples, images 702, 704, and 706 may have respective resolutions according to any example described above in relation to FIGS. 7A-7F. In some examples, features and functionalities described herein in relation to FIG. 8 may be provided in combination with features and functionalities described herein in relation to any of FIGS. 1-7F and 9-10.

Figure 9:
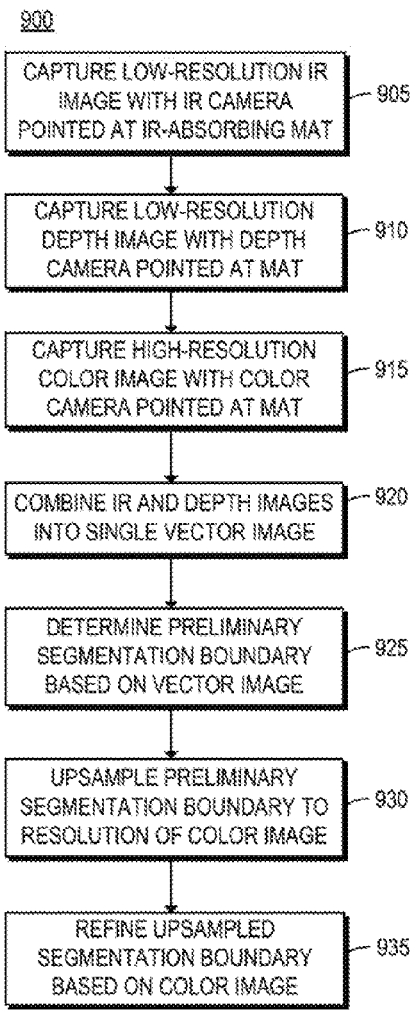
FIG. 9 is a flowchart of an example method for determining a segmentation boundary.

FIG. 9 is a flowchart of an example method 900 for determining a segmentation boundary. Although execution of method 900 is described below with reference to computing system 100 of FIGS. 1-7B, other suitable systems for execution of method 900 can be utilized (e.g., system 100 with computing device 350). Additionally, implementation of method 900 is not limited to such examples.

At 905 of method 900, IR camera 164B, disposed above and pointing at IR-absorbing surface 200 of computing system 100, may capture a low-resolution IR image 704 (see FIG. 7D) representing an object 35 disposed between IR-absorbing surface 200 and IR camera 164B used to capture image 704. At 910, depth camera 164C, disposed above and pointing at the IR-absorbing surface, may capture a low-resolution depth image 706 (see FIG. 7E) representing object 35 disposed between IR-absorbing surface 200 and depth camera 164C used to capture image 706. At 915, RGB camera 164A (or another type of color camera 164A), disposed above and pointing at IR-absorbing surface 200, may capture a high-resolution RGB image 702 (or other high-resolution color image 704) representing object 35 disposed between IR-absorbing surface 200 and RGB camera 164A used to capture image 702.

At 920, engine 172 may combine IR image 704 and depth image 706 into a single vector image 190 comprising data from IR image 704 and from depth image 706 at each pixel, as described above. At 925, engine 174 may determine a preliminary segmentation boundary for object 35 based on vector image 190, as described above. At 930, engine 176 may upsample the preliminary segmentation boundary to the resolution of RGB image 702, as described above. At 935, engine 178 may refine the upsampled preliminary segmentation boundary based on RGB image 702, as described above, to determine a segmentation boundary 706 for object 35.

Although the flowchart of FIG. 9 shows a specific order of performance of certain functionalities, method 900 is not limited to that order. For example, the functionalities shown in succession in the flowchart may be performed in a different order, may be executed concurrently or with partial concurrence, or a combination thereof. In some examples, features and functionalities described herein in relation to FIG. 9 may be provided in combination with features and functionalities described herein in relation to any of FIGS. 1-8 and 10.

Figure 10:
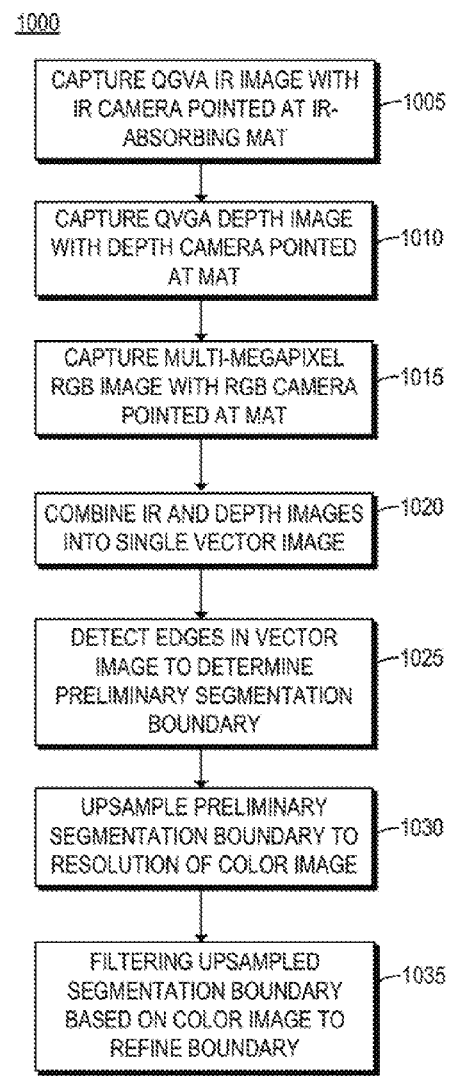
FIG. 10 is a flowchart of an example method for filtering an upsampled segmentation boundary.

FIG. 10 is a flowchart of an example method 1000 for filtering an upsampled segmentation boundary. Although execution of method 1000 is described below with reference to computing system 100 of FIGS. 1-7B, other suitable systems for execution of method 1000 can be utilized (e.g., system 100 with computing device 350). Additionally, implementation of method 1000 is not limited to such examples.

At 1005 of method 1000, IR camera 164B, disposed above and pointing at IR-absorbing surface 200 of computing system 100, may capture a QVGA resolution IR image 704 (see FIG. 7D) representing an object 35 disposed between IR-absorbing surface 200 and IR camera 164B. At 1010, depth camera 164C, disposed above and pointing at the IR-absorbing surface, may capture a QVGA resolution depth image 706 (see FIG. 7E) representing object 35 disposed between IR-absorbing surface 200 and depth camera 164C. At 1015, RGB camera 164A (or another type of color camera 164A), disposed above and pointing at IR-absorbing surface 200, may capture an RGB image 702 (or other color image 702) having a resolution of multiple megapixels and representing object 35 disposed between IR-absorbing surface 200 and RGB camera 164A used to capture image 702.

At 1020, engine 172 may combine IR image 704 and depth image 706 into a single vector image 190 comprising data from IR image 704 and from depth image 706 at each pixel, as described above. In some examples, prior to combining images 704 and 706, images 702, 704, and 706 may be geometrically aligned, as described above. At 1025, engine 174 may detect edges in vector image 190 where the presence of an edge is indicated by the either of the data from IR image 704 and the data from depth image 706. In such examples, engine 174 may determine a preliminary segmentation boundary for object 35 based on the detected edge(s). At 1030, engine 176 may upsample the preliminary segmentation boundary to the resolution of RGB image 702, as described above. At 1035, engine 178 may filter the upsampled segmentation boundary based on RGB image 702 to determine a refined segmentation boundary 708, as described above.

Although the flowchart of FIG. 10 shows a specific order of performance of certain functionalities, method 1000 is not limited to that order. For example, the functionalities shown in succession in the flowchart may be performed in a different order, may be executed concurrently or with partial concurrence, or a combination thereof. In some examples, features and functionalities described herein in relation to FIG. 10 may be provided in combination with features and functionalities described herein in relation to any of FIGS. 1-9.

What is claimed is:

1. A computing system comprising:
   an infrared (IR)-absorbing surface that is disposed approximately horizontally;
   an IR camera disposed above and pointed at the IR-absorbing surface to capture an IR image representing an object disposed between the IR camera and the IR-absorbing surface based on IR light reflected by the object;
an RGB camera to capture an RGB image representing the object disposed between the RGB camera and the IR-absorbing surface;
a depth camera to capture a depth image representing the object disposed between the depth camera and the IR-absorbing surface;
a segmentation engine to determine a segmentation boundary representing at least one outer edge of the object based on the IR image, the depth image, and the RGB image, wherein the segmentation boundary is determined independent of any prior image of the object captured by any of the IR, depth, and RGB cameras;
a projection assembly to project visible images on the IR-absorbing surface and the object;
wherein the segmentation engine is to determine the segmentation boundary representing the at least one outer edge of the object based on the IR, depth, and RGB images captured during the projection of the visible images; and
wherein the IR-absorbing surface further comprises a touch-sensitive region to detect physical contact with the touch-sensitive region.

2. The computing system of claim 1, wherein:
the IR camera is a low-resolution IR camera and the IR image is a low-resolution IR image;
the depth camera is a low-resolution depth camera and the depth image is a low-resolution depth image; and
the RGB camera is a high-resolution RGB camera and the RGB image is a high-resolution RGB image.

3. The computing system of claim 2, wherein the segmentation engine comprises:
a combine engine to combine the IR and depth images into a single vector image;
a boundary engine to determine a preliminary segmentation boundary for the object based on the vector image;
an upsample engine to upsample the preliminary segmentation boundary to the resolution of the RGB image; and
refine engine to refine the upsampled preliminary segmentation boundary based on the RGB image to obtain the segmentation boundary.

4. The computing system of claim 2, wherein the segmentation engine comprises:
an upsample engine to upsample the IR and depth images to the resolution of the RGB image;
a combine engine to combine the RGB image and the upsampled IR and depth images into a single vector image; and
a boundary engine to determine the segmentation boundary based on the vector image.

5. The computing system of claim 2, wherein:
the IR camera and the IR image have a quarter video graphics array (QVGA) resolution;
the depth camera and the depth image have the QVGA resolution; and
the RGB camera and the RGB image have a resolution of multiple megapixels (MPs).

6. The computing system of claim 1, wherein:
the IR camera is to detect lesser intensity of IR light from the IR-absorbing surface than from the object such that portions of the IR image representing the IR-absorbing surface include lesser IR light intensity values than higher IR light intensity values included in portions of the IR image representing the object; and
the segmentation engine is to determine the segmentation boundary based at least in part on at least one boundary between the lesser IR light intensity values and the greater IR light intensity values.

7. A non-transitory machine-readable storage medium comprising instructions executable by a processing resource of a computing system comprising a horizontal infrared (IR)-absorbing surface and IR camera, a depth camera, and a color camera, each disposed above and pointed at the IR-absorbing surface, the instructions executable to:
acquire, from the IR camera, an IR image representing an object disposed between the IR camera and the IR-absorbing surface based on IR light reflected by the object;
acquire, from the depth camera, a depth image representing respective distances of portions of the object disposed between the depth camera and the IR-absorbing surface;
acquire, from the color camera, a color image having a higher resolution than each of the IR image and the depth image and representing the object disposed between the color camera and the IR-absorbing surface;
determine a preliminary segmentation boundary for the object based on the IR image data and the depth image data;
upsample the preliminary segmentation boundary to the resolution of the color image; and
refine the upsampled preliminary segmentation boundary based on the color image to determine a segmentation boundary for the object.

8. The storage medium of claim 7, wherein the instructions to determine comprise instructions to:
combine the IR and depth images into a single vector image comprising, for each pixel of the vector image, an IR intensity value from a corresponding pixel of the IR image and a depth value from a corresponding pixel of the depth image; and
detect edges in the vector image based on both the IR intensity value and depth values at each pixel of the vector image.

9. The storage medium of claim 7, wherein:
the color camera is an RGB camera and the color image is an RGB image;
the resolution of each of the IR, depth, and RGB images is a two-dimensional pixel resolution; and
the two-dimensional pixel resolution of the RGB image is at least ten times greater than the two-dimensional pixel resolution of the IR image in each dimension, and at least ten times greater than the two-dimensional pixel resolution of the depth image in each dimension.

10. A method comprising:
capturing a low-resolution infrared (IR) image with an IR camera disposed above and pointing at an IR-absorbing surface;
capturing a low-resolution depth image with a depth camera disposed above and pointing at the IR-absorbing surface;
capturing a high-resolution color image with a color camera disposed above and pointing at the IR-absorbing surface, wherein each of the IR image, the depth image, and the color image represents an object disposed between the IR-absorbing surface and the respective camera used to capture the image;

combining the IR image and the depth image into a single vector image comprising data from the IR image and from the depth image at each pixel;

determining a preliminary segmentation boundary for the object based on the vector image;

upsampling the preliminary segmentation boundary to the resolution of the color image; and refining the upsampled preliminary segmentation boundary based on the color image to determine a segmentation boundary for the object.

11. The method of claim 10, wherein determining the segmentation boundary comprises:

detecting edges in the vector image where the presence of an edge is indicated by the either of the data from the IR image and the data from the depth image.

12. The method of claim 11, wherein:

the IR image has quarter video graphics array (QVGA) resolution;

the depth image has QVGA resolution;

the resolution of the color image is multiple mexapixels (MPs);

the color image is an RGB image; and the refining comprises filtering the upsampled segmentation boundary based on the RGB image to obtain a refined segmentation boundary.

* * * * *